(12) United States Patent
Gerstler et al.

(10) Patent No.: US 9,255,664 B2
(45) Date of Patent: Feb. 9, 2016

(54) CRYOGENIC FUEL SYSTEM WITH AUXILIARY POWER PROVIDED BY BOIL-OFF GAS

(71) Applicant: General Electric Company, Schenectady, NY (US)

(72) Inventors: William Dwight Gerstler, Niskayuna, NY (US); Laura Michele Hudy, Waterford, NY (US); Chiranjeev Kalra, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 218 days.

(21) Appl. No.: 13/726,440

(22) Filed: Dec. 24, 2012

(65) Prior Publication Data

US 2014/0174083 A1 Jun. 26, 2014

(51) Int. Cl.
*F01K 25/00* (2006.01)
*F17C 9/04* (2006.01)
(Continued)

(52) U.S. Cl.
CPC . *F17C 9/04* (2013.01); *B64D 37/00* (2013.01); *B64D 37/30* (2013.01); *B64D 41/00* (2013.01); *F01K 25/08* (2013.01); *F17C 9/00* (2013.01);
(Continued)

(58) Field of Classification Search
CPC ...... F17C 13/083; F17C 13/005; F17C 13/02; F17C 13/08; F17C 2221/033; F17C 9/00; F17C 9/04; B64D 37/30; B64D 37/00; B64D 41/00; F01K 25/08; Y02T 50/44
USPC ............ 244/58, 135 R, 50; 60/651, 671
See application file for complete search history.

(56) References Cited

U.S. PATENT DOCUMENTS 4,417,878 A * 11/1983 Koren ............................. 440/3
7,726,359 B2    6/2010 Hartono et al.
(Continued)

FOREIGN PATENT DOCUMENTS

KR    101187532 B1 *  2/2012
KR    101187532 B1 * 10/2012
(Continued)

OTHER PUBLICATIONS

Gilmore et al.,"LNG Carrier Alternative Propulsion Systems", Maran Gas Maritime Inc, pp, 1-36, Feb. 17, 2005.
(Continued)

*Primary Examiner* — Audrey K Bradley
*Assistant Examiner* — Wesley Harris
(74) *Attorney, Agent, or Firm* — John P. Darling

(57) ABSTRACT

A system in one embodiment includes a detection unit, a boil-off auxiliary power unit, and a controller. The detection unit is configured to detect a characteristic of a boil-off gas stream from a cryotank configured to hold a cryogenic fluid. The boil-off auxiliary power unit is configured to receive the boil-off gas stream and use the boil-off gas stream to provide auxiliary power to a vehicle system. The controller is configured to acquire information from the detection unit corresponding to the characteristic; determine, using the information acquired from the detection unit, an available boil-off auxiliary energy that is available from the boil-off auxiliary power unit; determine a mode of operation of the vehicle system; determine a required auxiliary energy for the vehicle system; and to operate the auxiliary power unit based on the available boil-off auxiliary energy, the mode of operation, and the required auxiliary energy.

11 Claims, 6 Drawing Sheets

(51) Int. Cl.
*F01K 25/08* (2006.01)
*F17C 13/02* (2006.01)
*F17C 13/08* (2006.01)
*F17C 9/00* (2006.01)
*B64D 37/00* (2006.01)
*F17C 13/00* (2006.01)
*B64D 37/30* (2006.01)
*B64D 41/00* (2006.01)

(52) U.S. Cl.
CPC ............... *F17C 13/005* (2013.01); *F17C 13/02* (2013.01); *F17C 13/08* (2013.01); *F17C 13/083* (2013.01); *F17C 2221/033* (2013.01); *Y02T 50/44* (2013.01)

(56) References Cited

U.S. PATENT DOCUMENTS

| | | | | |
|---|---|---|---|---|
| 7,793,502 | B2* | 9/2010 | Lee et al. | 60/716 |
| 2004/0211192 | A1* | 10/2004 | Lechner | 62/53.2 |
| 2010/0187237 | A1* | 7/2010 | Brooks et al. | 220/560.04 |
| 2011/0302923 | A1* | 12/2011 | Hartono et al. | 60/716 |
| 2013/0306643 | A1* | 11/2013 | Lee et al. | 220/560.12 |
| 2014/0041398 | A1* | 2/2014 | Aoki | 62/48.2 |
| 2014/0116062 | A1* | 5/2014 | Hartono | 60/772 |

FOREIGN PATENT DOCUMENTS

| | | |
|---|---|---|
| WO | 2010039198 A1 | 4/2010 |
| WO | WO 2011156630 A2 * | 12/2011 |
| WO | 2012040835 A1 | 4/2012 |
| WO | 2012045028 A1 | 4/2012 |
| WO | 2012045031 A1 | 4/2012 |
| WO | 2012045035 A2 | 4/2012 |

OTHER PUBLICATIONS

Veldhuis et al, "A Hydrogen Fuelled. Fast Marine Transportation System", World Hydrogen Energy Conference (WHEC), pp. 1-11, Jun. 2006.

"MAN Diesel Demonstrates its Dual-Fuel Technology", MAN Diesel & Turbo, 2006.

* cited by examiner

CRYOGENIC FUEL SYSTEM WITH AUXILIARY POWER PROVIDED BY BOIL-OFF GAS

BACKGROUND

Cryogenic fluids may be used on-board aircraft, trains, ships, motor vehicles, or in other applications that limit the size or weight of a system utilizing cryogenic fluids. For example, some aircraft engines are configured to use natural gas as fuel. The natural gas may be stored on-board the aircraft as liquid natural gas (LNG), which is a cryogenic fluid. Cryogenic fluids may be stored on-board aircraft within a cryogenic tank that holds a volume of the cryogenic fluid. After a cryogenic tank is filled with LNG, the tank may be exposed to higher temperatures (e.g., higher temperatures than the boiling point of LNG). As ambient temperature increases, increasing amounts of LNG within the tank may evaporate as a boil-off gas, creating increasing pressure within the cryogenic tank. Thus, to address the increasing pressure within the cryogenic tank, the boil-off gas may be released from the tank, for example, through a valve. In some systems, the boil-off gas may be vented directly to the atmosphere. However, venting the boil-off gas to the atmosphere has drawbacks and undesirable effects.

BRIEF DESCRIPTION

In one embodiment, a system is provided including a detection unit, a boil-off auxiliary power unit, and a controller. The detection unit is configured to detect a characteristic of a boil-off gas stream from a cryotank configured to hold a cryogenic fluid. The boil-off auxiliary power unit is configured to receive the boil-off gas stream and use the boil-off gas stream to provide auxiliary power to a vehicle system. The controller is configured to acquire information from the detection unit corresponding to the characteristic; determine, using the information acquired from the detection unit, an available boil-off auxiliary energy that is available from the boil-off auxiliary power unit; determine a mode of operation of the vehicle system; determine an auxiliary energy level for the vehicle system; and to operate the auxiliary power unit based on the available boil-off auxiliary energy, the mode of operation, and the required auxiliary energy.

In another embodiment, a method is provided for providing auxiliary power (e.g., auxiliary power for a vehicle system such as an aircraft). The method includes determining a mode of operation at which a vehicle system is operating, determining an auxiliary energy level, and determining an available boil-off auxiliary energy level that is available from a boil-off gas stream from a cryotank configured to hold a cryogenic fluid. The method also includes operating a boil-off auxiliary energy module based on the mode of operation, the auxiliary energy level, and the available boil-off auxiliary energy level. The boil-off auxiliary energy module is configured to utilize the boil-off gas stream to provide energy to one or more auxiliary components of the vehicle system.

In another embodiment, a tangible and non-transitory computer readable medium including one or more computer software modules is provided. The one or more computer software modules are configured to direct at least one processor to determine a mode of operation at which a vehicle system is operating, determine an auxiliary energy level, and determine an available boil-off auxiliary energy level that is available from a boil-off gas stream from a cryotank configured to hold a cryogenic fluid. The one or more computer software modules are also configured to direct the at least one processor to operate a boil-off auxiliary energy module based on the mode of operation, the auxiliary energy level, and the available boil-off auxiliary energy level. The boil-off auxiliary energy module is configured to utilize the boil-off gas stream to provide energy to one or more auxiliary components of the vehicle system.

DETAILED DESCRIPTION

Figure 1:
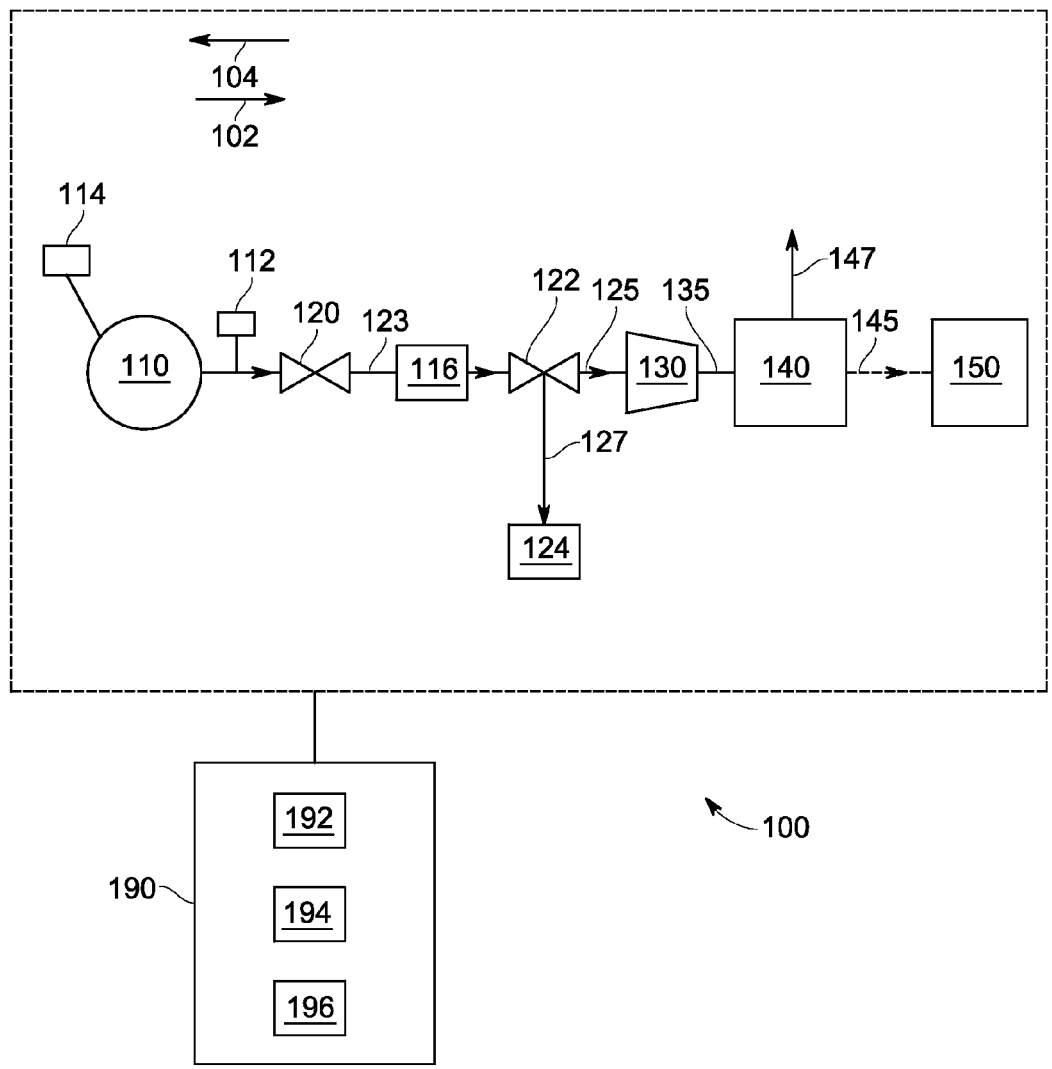
FIG. 1 is a schematic view of a system for utilizing boil-off gas to provide auxiliary power in accordance with various embodiments.

Various embodiments will be better understood when read in conjunction with the appended drawings. To the extent that the figures illustrate diagrams of the functional blocks of various embodiments, the functional blocks are not necessarily indicative of a division between hardware and/or circuitry. Thus, for example, one or more of the functional blocks may be implemented in a single piece of hardware or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide for reduced emission of combustible gases and/or otherwise potentially harmful emissions, while providing for relatively compact, lightweight cryogenic tanks and auxiliary power systems that are configured to provide auxiliary power from a boil-off gas stream of a cryogenic fluid to a cryotank. Thus, various embodiments also provide for fuel conservation and/or use of a less expensive fuel to provide auxiliary power. Auxiliary power for a system may be understood as power for one or more aspects or sub-systems of a system that are used to support operation of the system, but not necessarily for a primary purpose of the system. For example, an aircraft system may be understood as having a primary purpose of providing a motive effort for propulsion (e.g., through the air or across a runway). Auxiliary power in an aircraft system may be understood as power used for purposes other than producing motive effort, such as lighting various portions of the aircraft, starting an engine, providing heating, cooling, or the like, operating various doors, hatches, or other mechanisms, providing power to one or more control systems, or the like.

Various embodiments utilize boil-off gas from a cryotank to provide auxiliary power instead of disposing of the boil-off gas. In some embodiments, an auxiliary power module that uses boil-off gas may be selectively operated, for example, to provide auxiliary power when supply of boil-off gas is at a relatively high level and/or when demand for auxiliary power is at a relatively high level. For example, in some embodiments, an auxiliary power module that uses boil-off gas may be provided on an aircraft. In normal flight operation, auxiliary power may typically be provided by the aircraft's propulsion units. However, demand for auxiliary power may be at relatively high levels when the aircraft is grounded, with the propulsion engines operating at relatively low levels, or even turned off. Further, the supply of boil-off gas may be at a relatively high level when an aircraft is grounded, for example, before embarking on a trip or mission, as a cryogenic tank may be generally full at such a time and/or exposed to a higher ambient temperature than during flight. Thus, in some embodiments, an auxiliary power module using boil-off gas may be employed when an aircraft is grounded. In various embodiments, use of an auxiliary power module using boil-off gas (e.g., boil-off gas from a LNG cryotank) may help conserve jet fuel, which may be more expensive than LNG.

In various embodiments, an auxiliary power module may be selectively operated based on a mode of operation of a vehicle system. In some embodiments, an aircraft may be operable in a variety of modes. The aircraft may be operable in non-flying modes (e.g., propulsion engines off, start-up, idling, taxiing along a runway or other surface, or the like) as well as flying modes (take-off, cruising, climbing, acceleration, emergency, or the like). In embodiments, the auxiliary power unit using boil-off gas may be operated to provide auxiliary power when the propulsion engines of an aircraft are off or operating at generally low levels (e.g., a non-flying mode such as propulsion engines off or idling). When the propulsion engines are operating at generally higher levels, auxiliary power may be provided by the propulsion engines, so that the auxiliary power unit using boil-off gas may not be operated to provide auxiliary power when the propulsion engines are operating a generally high levels (e.g., take-off, climbing or the like). In some embodiments, the auxiliary power module using boil-off gas may be employed to provide auxiliary power when the aircraft is operating in an emergency mode, allowing power from the propulsion engines to be focused for propulsion, while still allowing use of at least some auxiliary units.

Various embodiments are provided for powering an auxiliary power module using a boil-off gas of a cryogenic fluid (e.g., LNG) stored in a cryotank, for example on-board an aircraft. At least one technical effect of various embodiments is a relatively lightweight system for handling boil-off gas. At least one technical effect of various embodiments provides power for use by one or more auxiliary power modules. At least one technical effect of various embodiments is reduction or elimination of harmful or otherwise undesirable emissions from boil-off gas. At least one technical effect of various embodiments includes the conservation of a fuel (e.g., jet fuel). At least one technical effect of various embodiments is to reduce pressure within a cryogenic tank and/or provide for the use of a lighter cryogenic tank.

FIG. 1 is a schematic view of a system 100 formed in accordance with an embodiment. The system 100 (along with other embodiments of systems and methods described herein) is discussed below in connection with the use of liquid natural gas (LNG) as a source of power, for example, for propulsion of an aircraft. The system 100 may be configured to have a generally low weight, or use lightweight materials where appropriate, to reduce the weight of the system 100 that is required to be carried onboard an aircraft, for example. In various embodiments, other fuels may be used and/or alternate applications may be powered. The illustrated system 100 includes a cryogenic tank 110, a control valve 120, a splitter valve 122, a boil-off treatment module 124, a compressor 130, a boil-off auxiliary power unit 140, an auxiliary functional module 150, and a controller 190.

Generally, boil-off gas (or a gas or other product formed using the boil-off gas) from the cryogenic tank 110 is passed in a downstream direction 102 through aspects of the system 100. (An upstream direction 104 may be understood as the opposite direction of the downstream direction.) As the boil-off gas (or a gas or other product formed using the boil-off gas) passes through various aspects of the system, the boil-off gas is used to provide energy to one or more auxiliary powered units of a system, for example a vehicle system such as an aircraft.

As seen in FIG. 1, the system 100 defines a downstream direction 102 and an upstream direction 104. The downstream direction 102 may be understood as the direction or path followed by boil-off gas (or products of boil-off gas) as the boil-off gas (or products of boil-off gas) is treated or processed. In the illustrated embodiment, boil-off gas flows from the cryogenic tank 110 via the control valve 120 as a boil-off gas stream 123. The boil-off gas stream 123 flows in the downstream direction 102 to the splitter valve 122. At the splitter valve 122, all or a portion of the boil-off gas stream 123 may be directed as a power stream 125 and/or a treatment stream 127. In the illustrated embodiment, the treatment stream 127 is directed to the boil-off treatment module 124 for further treatment (e.g., to reduce a dangerous, harmful, or otherwise emission, to re-condense the treatment stream 127 for return to the cryogenic tank 110, or the like).

The power stream 125 is directed in the downstream direction 102 toward the boil-off auxiliary power unit 140. Before arriving at the boil-off auxiliary power unit 140, the power stream 125 of the embodiment depicted in FIG. 1 first passes through a compressor 130 to increase the pressure of the power stream 125 to provide a pressurized stream 135 to the boil-off auxiliary module 140. At the boil-off auxiliary module 140, the pressurized stream 135 is utilized to produce energy (e.g., electrical energy created via the use of, for example, a turbine having blades over or through which passes the pressurized stream 135 or a product of combustion of the pressurized stream 135). The exhaust (not shown) may be vented or further treated, while power output 145 goes to the auxiliary functional module 150. The controller 190 is configured to receive information regarding one or more streams or flows through the system 100, and to control the various flows or streams (e.g., by controlling the settings on one or more valves, pumps, or the like) through the system 100. The controller 190 may also acquire or determine available power levels from the boil-off auxiliary power unit 140 and/or required power levels for devices or components requiring auxiliary power, and operate the system 100 accordingly.

The cryogenic tank 110 in the illustrated embodiment is used to contain a cryogenic fluid. In various embodiments, the cryogenic fluid contained by the at least one cryogenic tank 110 may be any type of cryogenic fluid (which may be contained within the cryogenic tank 110 in liquid and/or gaseous form), such as, but not limited to, LNG, CNG, or the like. In some embodiments, the cryogenic tank 110 is a fuel tank on-board an aircraft for containing LNG or another cryogenic fluid that is used as fuel for an engine of the aircraft. The cryogenic tank 110 (and/or other aspects of the system 100) may be configured in some embodiments as a relatively permanent feature of an aircraft or be built into an aircraft, while in other embodiments, the cryogenic tank 110 and other aspects of the system 100 may be configured as a generally stand-alone unit that may readily be loaded or un-loaded from an aircraft.

The cryogenic tank 110, in some embodiments includes a shell and an internal reinforcement frame (not shown). The shell may define an internal volume that is bounded by an interior side of the shell, and may be configured to contain the first cryogenic fluid within the internal volume. The cryogenic tank 110 thus may define a closed container configured to hold the first cryogenic fluid therein. The cryogenic tank 110 may define a pressure vessel that is configured to hold the first cryogenic fluid therein at a pressure that is different than ambient (e.g., atmospheric) pressure.

For example, as ambient temperature rises and/or due to imperfect insulation and exposure to a temperature above the saturation or boiling point, LNG within the cryogenic tank 110 will evaporate, producing a boil-off gas. As the amount of boil-off gas increases, the pressure within the cryogenic tank 110 will increase. At some point, the pressure may become too large for the cryogenic tank 110. In the illustrated embodiment, the system 100 includes a tank sensor 112. The tank sensor 112 is configured to sense or detect, directly or indirectly, when the pressure within the cryogenic tank 110 exceeds a desired or acceptable level (e.g., a level selected from a range beneath a maximum pressure for which the cryogenic tank 110 is designed to withstand or for which the cryogenic tank 110 is rated). For example, the tank sensor 112 may include a pressure sensor configured to measure or detect the pressure within the cryogenic tank 110.

The control valve 120 is configured to control a flow of boil-off gas out of the cryogenic tank 110 in the downstream direction 102 to the splitter valve 122. (From the splitter valve 122, the flow of boil-off gas stream may be directed to the boil-off auxiliary power unit 140 and/or the boil-off treatment module 124.) In the illustrated embodiment, the control valve 120 is interposed between the cryogenic tank 110 and the boil-off auxiliary power unit 140, and is disposed downstream of the cryogenic tank 110 and upstream of the boil-off auxiliary power unit 140. In some embodiments, the control valve 120 may be mounted inside, mounted to, or otherwise associated with the cryogenic tank 110. In the illustrated embodiment, when a pressure exceeding a threshold is detected by the tank sensor 112, the control valve 120 opens to allow passage of boil-off gas in the downstream direction 102 as the boil-off gas stream 123, thereby helping reduce the pressure in the cryogenic tank 110. In various embodiments, the boil-off gas may be passed from the cryogenic tank 110 at a pressure slightly higher than atmospheric pressure and at the saturation temperature of natural gas (which may be lower than ambient temperature). In some embodiments, the control valve 120 may be closed if the pressure in the cryogenic tank 110 drops below a threshold.

As the boil-off gas stream 123 passes in the downstream direction, the boil-off gas stream 123 passes through, by, or otherwise proximate to the detection unit 116. The detection unit 116 includes one or more detectors or sensors configured to detect, sense, measure, or determine one or more characteristics of the boil-off gas stream 123. For example, the detection unit 116 may detect, sense, measure, or determine one or more of a mass and/or volumetric flow, a pressure, temperature, or the like of the boil-off gas stream 123. The detection unit 116 may also be configured to provide information to the controller 190 that may be used by the controller 190 to operate one or more aspects of the system 100. For example, the detection unit 116 may provide pressure information to the controller 190. In some embodiments, the controller 190 may then use the pressure information to determine an amount of pressure to be added (e.g., via the compressor 130) to the boil-off gas stream 123 for proper operation of the boil-off auxiliary power unit 140.

As another example, the detection unit 116 may provide flow information corresponding to the flow of the boil-off gas stream 123. Using the flow information, the controller 190 may then determine an available amount of energy that may be provided by the auxiliary power module 140 when provided with the flow detected or determined for the boil-off gas stream 123. The controller 190 may then operate the system 100 (e.g., the splitter valve 122) using the determined available energy. For example, if the available energy is more than an amount of energy that may be beneficially employed by one or more auxiliary devices, the splitter valve 122 may be operated to direct a portion of the boil-off gas stream 123 (e.g., an amount that may be used to provide the amount of energy that may be employed by the one or more auxiliary devices) to the auxiliary power unit 140, and to direct the remainder of the boil-off gas stream to the boil-off treatment module 124. As another example, if all of the boil-off gas stream 123 may be employed (e.g., an energy level required, desired, expected to be used, or the like may meet or exceed the energy available using the boil-off gas stream 123), then the splitter valve 122 may be set to direct all of the boil-off gas stream 123 to the boil-off auxiliary power unit 140. In the illustrated embodiment, the tank sensor 112 and the detection module 116 are depicted as separate elements. In various embodiments, all or a portion of the tank sensor and detection module 116 may be integrated or incorporated into a single unit.

The splitter valve 122 is configured to receive the boil-off gas stream 123 and direct the received boil-off gas as one or both of the power stream 125 or the treatment stream 127. In various embodiments, the controller 190 is configured to operate one or more settings of the splitter valve 122 to direct the flow of the boil-off gas stream 123 based on the operation of the boil-off auxiliary power unit 140. In one example scenario, where the boil-off auxiliary power unit 140 is not being operated to provide auxiliary power (e.g., during a mode of operation such as cruising or climbing when auxiliary power is provided by one or more propulsion engines), the boil-off gas stream 123 may be directed via the splitter valve as the treatment stream 127 for treatment by the boil-off treatment module 124. In another example scenario, where the boil-off auxiliary power unit 140 is being operated to provide auxiliary power (e.g., during a mode of operation such as propulsion engines off, idling, taxiing, start-up, emergency, or the like), the splitter valve 122 may be operated to direct the boil-off gas stream 123 to the boil-off auxiliary power unit 140 as the power stream 125. In still another example scenario, where the boil-off auxiliary power unit 140 is being operated to provide auxiliary power, but where the boil-off gas stream 123 exceeds the intake capacity of the boil-off auxiliary power unit 140 and/or where the boil-off auxiliary power unit 140 requires or has use for less than the entire boil-off gas stream 123, a portion of the boil-off gas stream 123 may be directed via the splitter valve 122 as the power stream 125 to the boil-off auxiliary power unit 140, and the remainder of the boil-off gas stream 123 may be directed via the splitter valve 122 as the treatment stream 127.

As indicated above, all or a portion of the boil-off gas stream 123 that is not used by the boil-off auxiliary power unit 140 may be directed as a treatment stream 127 to the boil-off treatment module 124. The boil-off treatment module 124 is configured to remove boil-off gas from the system 100 (e.g., to reduce a pressure in the cryogenic tank 110, to reduce harmful or otherwise undesirable emissions, and/or to recycle boil-off gas and return a condensed liquid to the cryogenic tank 110). In the illustrated embodiment, the boil-off treatment module 124 is depicted as a single block. In various embodiments, more than one treatment module 124 may be employed. The boil-off treatment module 124 may include one or more of an oxidation module configured to oxidize boil-off gas to eliminate or reduce a harmful or otherwise undesirable emission, a re-condensing module configured to condense boil-off gas and return the condensed boil-off gas to the cryogenic tank 110 as a liquid (e.g., LNG), an emergency vent configured to vent the boil-off gas to the atmosphere to reduce a pressure within the cryogenic tank 110, or the like.

In the illustrated embodiment, the power stream 125 (e.g., the portion of the boil-off gas stream 123 that is directed toward the boil-off auxiliary power unit 140) passes through a compressor 130. The compressor 130 is an example of a pressurization module configured to increase the pressure of a stream. For example, the boil-off gas stream 123 or power stream 125 may be at or near atmospheric pressure. However, the boil-off auxiliary power unit 140 may require or operate more efficiently at an increased pressure at an intake for proper operation. The compressor 130 may be configured to provide a pressurized stream 135 at a desired level or within a desired range for use by the boil-off auxiliary power unit 140. In some embodiments, for example where the boil-off auxiliary power unit 140 is configured as a reciprocating engine that may not require pressurization of the power stream 125, the compressor 130 (or other pressurization module) may not be used.

In the illustrated embodiment, the pressurized stream 135 is next received by the boil-off auxiliary power unit 140. The boil-off auxiliary power unit 140 may be configured to provide power to auxiliary systems (e.g., lighting, air conditioning, or the like) of a vehicle system. For example, the boil-off auxiliary power unit 140 may receive the pressurized stream 135, combust all or a portion of the boil-off gas in the pressurized stream 135, and provide electrical energy as an output along path 145. In some embodiments, the boil-off auxiliary power unit 140 may be configured as a turbine (and may require a pressurized intake stream of boil-off gas). The boil-off auxiliary power unit 140 may include a generator configured to produce electrical energy using a mechanical input (e.g., rotation of a shaft) actuated by a turbine or other engine. In some embodiments, the boil-off auxiliary power unit 140 may be configured as a reciprocating engine (and may not require the boil-off gas stream to pass through a pressurization module). Generally, use of a turbine may provide for reduced weight of the boil-off auxiliary power unit 140, whereas use of a reciprocating engine may increase efficiency of the boil-off auxiliary power unit 140. In still other embodiments, the boil-off auxiliary power unit 140 may be configured as a fuel cell. Further still, in various embodiments, more than one boil-off auxiliary power unit 140 may be employed. For example, one or more boil-off auxiliary power units may be dedicated to one or more auxiliary components. In some embodiments, a boil-off auxiliary power unit may be located proximate to an auxiliary component configured to receive energy from the boil-off auxiliary power unit. For example, a boil-off auxiliary power unit may be configured to provide energy to a starter module for a propulsion engine, and may be positioned proximate to the starter module. In the illustrated embodiment, after the pressurized stream 135 is consumed by the boil-off auxiliary power unit 140 to produce energy, an exhaust stream 147 (e.g., containing products of combustion from combusting the pressurized stream 135) is exhausted from the boil-off auxiliary power unit 140 for further treatment and/or venting to the atmosphere.

In various embodiments, the boil-off auxiliary power unit 140 may be operated to provide power at some times (e.g., all or a portion of the boil-off gas stream 123 may be directed to the boil-off auxiliary power unit 140), and operated not to provide power at other times (e.g., the boil-off gas stream 123 is not directed toward the boil-off auxiliary power unit 140). For example, the boil-off auxiliary power unit 140 may be operated to provide energy when demand for auxiliary power is generally high, when supply of auxiliary power from a different source (e.g., a propulsion engine) is generally low, when boil-off gas is readily available, or the like, and not operated to provide energy when demand for auxiliary power is generally low, when supply of auxiliary power from a different source (e.g., a propulsion engine) is generally high, when boil-off gas is not available in an amount to provide a threshold or desired energy level, or the like. In some embodiments, the boil-off auxiliary power unit 140 may be operated to provide energy when a vehicle system (e.g., an aircraft) is operating in a first mode (e.g., a non-flying mode such as idling) and not operated to provide energy when the vehicle system (e.g., an aircraft) is in a second operating mode (e.g., a flying mode such as cruising). Alternatively or additionally, the auxiliary power unit 140 may be employed in modes where it is desired not to divert energy from a propulsion engine, such as in an emergency mode where one or more propulsion engines may be shut down or not operating properly.

In some embodiments, the boil-off auxiliary power unit 140 may be a dual fuel module configured to operate selectively using two or more different types of fuel. For example, the boil-off auxiliary power unit 140 may be disposed upon an aircraft, and configured to operate using either a boil-off gas from a first fuel (e.g., LNG) stored in a cryogenic tank, as well as to operate using a second fuel (e.g., jet fuel such as JP-8.) The controller 190 may be configured to determine which fuel to provide to the boil-off auxiliary power unit 140. For example, the controller may compare the amount of energy available from the boil-off auxiliary power unit 140 (e.g., based on the amount of boil-off gas flowing into the boil-off auxiliary power unit 140, the chemical makeup of the boil-off gas, and the efficiency of the boil-off auxiliary power unit 140) to the energy level demand for one or more auxiliary devices. If the energy available from the boil-off gas is sufficient to meet the demand, the controller 190 may operate the boil-off auxiliary power unit 140 using the boil-off gas. However, if the energy available from the boil-off gas is insufficient to meet the demand, the controller 190 may operate the boil-off auxiliary power unit 140 using the second fuel (e.g., jet fuel).

In some embodiments, the amount of fuel provided to the boil-off auxiliary power unit may be supplemented to allow for increased energy production than the energy that may be produced using boil-off gas available under standard operation. For example, in the illustrated embodiment, the system includes a heating module 114 configured to heat a liquid (e.g., LNG) within the cryogenic tank 110. The heating module 114, for example, may include an electric heater powered by a battery (not shown). In various embodiments, alternate sources of electricity may provide power to the electric heater. In one example scenario, when the boil-off auxiliary power unit 140 is not receiving sufficient boil-off gas to provide a desired energy level to auxiliary modules or devices, the controller 190 may operate the heating module 114 to increase the amount of boil-off gas produced by the cryogenic tank 110, thereby increasing the amount of energy that may be produced by the boil-off auxiliary power unit 140 receiving boil-off gas from the cryogenic tank 110. In another example scenario, an additional conduit or path (e.g., separate from a conduit or path providing boil-off gas to the auxiliary power module 140) may provide LNG from the cryogenic tank 110 to the boil-off auxiliary power unit 140 via an evaporator to provide an increased amount of gaseous fuel (e.g., natural gas) to the boil-off auxiliary power unit 140. In still another example scenario, the power available from the boil-off auxiliary power unit 140 may be supplemented by operation of an additional auxiliary power unit 140 that operates on a different fuel (e.g., jet fuel).

The auxiliary functional module 150 receives energy (e.g. electrical energy) along path 145 from the boil-off auxiliary power unit 140. The auxiliary functional module 150 may be understood as a module configured to perform a task or tasks that are used to support operation of a larger system, but not necessarily for a primary purpose of the larger system. For example, an aircraft system may be understood as having a primary purpose of providing a motive effort for propulsion (e.g., through the air or across a runway). Auxiliary functional modules in an aircraft system may be understood as modules that are configured to perform tasks other than the provision of motive effort, such as lighting various portions of the aircraft, starting an engine, providing heating, cooling, or the like, operating various doors, hatches, or other mechanisms, operating one or more control systems, or the like. In the illustrated embodiment, one auxiliary functional module 150 is depicted; however, additional auxiliary functional modules 150 may be employed in various embodiments. In some embodiments, a boil-off auxiliary power unit may be configured to provide energy that may be available to all auxiliary devices of a vehicle system, for example, via provision of power to a bus or the like. In some embodiments, a boil-off auxiliary power unit may be dedicated for use by a single auxiliary device or a group of auxiliary devices, and not be configured to provide power to other auxiliary devices.

As also indicated above, the controller 190 may be operably connected to and configured to control operations of the various components of the system 100. For example, the controller 190 may acquire information corresponding to the flow of boil-off gas (e.g., one or more of a flow, temperature, or pressure of a boil-off gas stream), determine an available auxiliary energy that may be produced using the boil-off gas, and control the various components of the system 100 accordingly, for example to produce energy via the boil-off auxiliary power unit 140 and distribute the energy produced to auxiliary systems or modules, to treat boil-off gas not used in the production of energy for auxiliary systems, to operate a heater to provide additional boil-off gas to supplement energy production, to provide additional fuel (e.g., in addition to the boil-off gas) to supplement energy production, to operate an additional auxiliary power unit that utilizes a different type of fuel to provide energy not provided by the boil-off auxiliary power unit 140, or the like. The controller 190 may be configured as a computer processor or other logic-based device that performs operations based on one or more sets of instructions (e.g., software). The instructions on which the controller 190 operates may be stored on a tangible and non-transitory (e.g., not a transient signal) computer readable storage medium, such as a memory 196. The memory 196 may include one or more computer hard drives, flash drives, RAM, ROM, EEPROM, and the like. Alternatively, one or more of the sets of instructions that direct operations of the controller 190 may be hard-wired into the logic of the controller 190, such as by being hard-wired logic formed in the hardware of the controller 190.

Using one or more of information corresponding to an amount of energy available that may be produced from a boil-off gas stream (e.g., amount of boil-off gas flow, type of gas in the boil-off gas stream, efficiency of the boil-off auxiliary power unit, or the like), mode of operation of a vehicle system (e.g., propulsion engines off, idling, start-up, take-off, cruising, climbing, emergency, flying, non-flying, or the like), and level of auxiliary energy (e.g., an estimated energy level to provide sufficient power for all or a portion of the auxiliary systems of a vehicle system, a threshold level corresponding to the estimated energy level to provide sufficient power, a portion of the estimated energy level, or an estimated energy level modified to provide a safety factor, a minimum or threshold level of energy at which operation of an auxiliary power unit is practical or desirable, or the like), the controller 190 determines when one or more auxiliary power units are operated to provide energy, the extent to which the one or more auxiliary power units are operated (e.g., at a full capacity, at a percentage of full capacity, or the like), where energy produced is directed, where boil-off gas not used to produce energy is directed, or the like. The controller 190 may be configured to operate the system by controlling the settings of valves, an auxiliary power unit (e.g., a setting such as revolutions per minute (rpm) at which an engine operates or the like), or the like. The controller 190 may receive information from sensors (e.g., sensors detecting flow, temperature, pressure, or the like at various points in the system 100; sensors detecting an amount of energy produced by the system 100; sensors detecting a mode or modes of operation of a vehicle associated with the system 100; sensors detecting parameters related to an amount of auxiliary energy that may be useful or desirable to auxiliary systems of a vehicle; or the like).

In one example scenario, the controller 190 may determine a mode of operation for a vehicle system, such as an aircraft. Some modes of operation may be determined as appropriate for use of energy provided by the boil-off auxiliary power unit 140, while other modes of operation may not. The mode may be determined for example, using information acquired from a sensor, controller, or the like associated with an external system. For example, information from the propulsion system of an aircraft indicating that the aircraft is either idling or that the propulsion engines are off may be acquired by the controller 190. The controller 190 may then determine the power available from the boil-off gas stream. For example, the controller 190 may determine an amount or rate of natural gas provided by a boil-off gas stream, and, using the amount along with an efficiency rating of the boil-off auxiliary power unit 140, determine an amount of energy that may be provided. The controller 190 may also determine an auxiliary energy level. In some embodiments, the auxiliary energy level may correspond to an amount of energy required by all or a group of auxiliary modules of an aircraft. In some embodiments, the auxiliary energy level may correspond to a minimum level at which operation of the boil-off auxiliary power unit 140 is practical or desirable (e.g., operation of a power unit may not be worthwhile if only a nominal amount of boil-off gas is available). In some embodiments, the auxiliary energy level may correspond to an energy that may be required, desirable, or useful to an auxiliary module to which an auxiliary power unit is dedicated.

In the example scenario, if the aircraft is operating in a mode deemed appropriate for use of the boil-off auxiliary power unit, and if the determined energy available from the boil-off gas stream satisfies a threshold corresponding to the auxiliary energy level determined, the controller 190 may act to operate the system 100 to provide auxiliary energy from the boil-off gas stream (e.g., by setting the splitter valve 122 to direct all or a portion of the available boil-off gas to the boil-off auxiliary power unit 140, to produce energy from the boil-off gas via the auxiliary power unit 140, to direct the energy produced to one or more auxiliary functional modules, or the like). The controller 190 may also monitor operations to determine if the operation of the boil-off auxiliary power unit 140 to produce energy is to be maintained. For example, if the mode of operation changes to a mode where auxiliary energy is more desirably provided by propulsion engines (e.g., cruising), if the available energy from the boil-off gas stream drops below a threshold, or the like, the controller 190 may adjust operation of the system 100 so that energy is not produced by the boil-off auxiliary power unit 140 (e.g., by directing the boil-off gas to a boil-off treatment module 124).

Further, in some embodiments, the controller 190 may act to determine a type of fuel provided to the boil-off auxiliary power unit 140. For example, the boil-off auxiliary power unit 140 may be configured as a dual fuel unit that may use boil-off gas as well as a second fuel, such as jet fuel. In one example scenario, the controller 190 may determine that the amount of boil-off gas available is insufficient to provide a desired energy level. In such a situation, the controller 190 may act to divert a boil-off gas stream from the boil-off auxiliary power unit and direct a flow of jet fuel (e.g., from a fuel tank associated with propulsion engines of a jet engine (not shown in FIG. 1)) to the boil-off auxiliary power unit 140. In some embodiments, where two or more auxiliary power units are employed, the controller 190 may select which auxiliary power units are operated at any given time to produce energy, or may apportion an energy level between multiple auxiliary power units (e.g., a first auxiliary power unit such as a boil-off gas auxiliary power unit operated to provide a first percentage of an energy level to be used by auxiliary modules, and a second auxiliary power unit such as an auxiliary power unit using jet fuel operated to provide the remainder of the energy to be used by the auxiliary modules). Thus, in some embodiments, an adequate supply of auxiliary energy may be provided while still conserving jet fuel (which may be more expensive than LNG). Additionally or alternatively, the controller 190 may select or apportion use of auxiliary power units utilizing different fuels based on the relative availabilities of the fuel (e.g., if a relatively low amount of a first fuel remains in a first storage system onboard an aircraft and relatively high amount of a second fuel remains in a second storage system, the controller 190 may preferentially use the second fuel to supply the boil-off auxiliary power unit 140).

Further still, in some embodiments, the controller 190 may be configured to direct the system 100 to provide supplemental energy if the available boil-off auxiliary energy is below a threshold. For example, if an insufficient amount of boil-off gas is available to provide a desired amount of energy, the controller 190 may operate the system 100 to produce additional energy from an additional power unit and/or to provide additional fuel to the boil-off auxiliary power unit 140. The controller 190 may control the system to increase a boil-off rate by increasing the boil-off rate above a natural boil-off rate (e.g., a boil-off rate that would occur without intervention or action by the controller 190). In the illustrated embodiment, the system 100 includes a heater 114 associated with the cryogenic tank 110. If an insufficient amount of boil-off gas is available from the cryogenic tank 110 to provide a desired auxiliary energy level, the controller 190 may direct the heater 114 to provide heat to the cryogenic tank 110 to increase the flow of boil-off gas from the cryogenic tank 110. The additional boil-off gas provided by the heating may be used as additional fuel by the boil-off auxiliary power unit 140 to supplement the amount of energy that could be produced otherwise (without the heating). In other embodiments, a separate conduit or path from the cryogenic tank 110 may provide supplemental fuel to the boil-off auxiliary power unit 140 when the energy available from a boil-off gas stream is below a threshold. For example, LNG from the cryogenic tank may be passed through an evaporator to provide additional natural gas (e.g., in addition to the boil-off gas available via a control and/or splitter valve) to the boil-off auxiliary power unit 140. Further still, in some embodiments, an additional auxiliary power unit (e.g., an auxiliary power unit operating on a different type of fuel) may be operated to provide supplemental energy).

The controller 190 of the illustrated embodiment includes a detection module 192, a control module 194, and a memory module 196 associated therewith. The detection module 192 is configured to receive information from sensors or detectors associated with the system 100 or otherwise accessible to the controller 190. The detection module 192 may also process the received information to determine one or more operating parameters of the system 100 (e.g., one or more settings of one or more components of the system 100. The control module 194 is configured to receive information from the detection module 192 and to control operation of the system 100 responsive to the received information. For example, the control module 194 may be configured to open, close, or adjust one or more valve settings or the like. By way of example, the control module 194 in the illustrated embodiment may, responsive to information received from sensors or detectors, control the settings of the splitter valve 122 (e.g., to change the proportion of flow of boil-off gas to one or more of an auxiliary power unit or boil-off treatment module), control the settings of the control valve 120 (e.g., to permit or prohibit flow of boil-off gas from the cryogenic tank 110 responsive to a determined pressure of the cryogenic tank 110), or the like. As another example, the control module 194 may be configured to control a level of operation of an auxiliary power unit (e.g., a throttle setting of an engine utilizing the boil-off gas), the distribution of power generated by an auxiliary power unit, or the like.

Thus, in various embodiments, a relatively compact and lightweight system may be provided that safely and effectively utilizes boil-off gas to provide energy to one or more auxiliary systems or modules of a vehicle, thereby conserving jet fuel that would otherwise be used by an auxiliary power unit and/or reducing harmful or otherwise undesirable emissions. It should be noted that the particular arrangement of components (e.g., the number, types, placement, or the like) of the illustrated embodiment may be modified in various alternate embodiments. In various embodiments, different numbers of a given module or unit may be employed, a different type or types of a given module or unit may be employed, a given module or unit may be added, or a given module or unit may be omitted.

Figure 2:
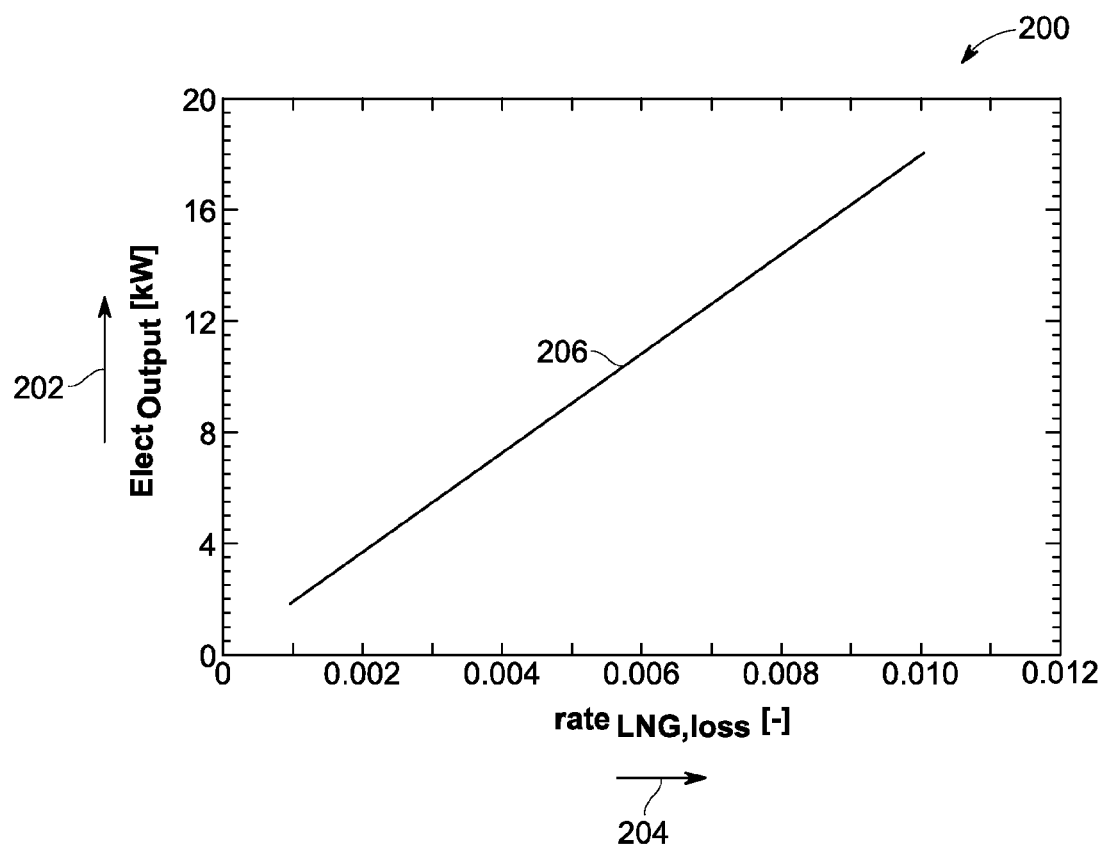
FIG. 2 is a graph of electrical power output from boil-off gas in accordance with various embodiments.

As mentioned above, a controller may determine an available energy that may be produced by a given auxiliary power unit provided with a given boil-off gas stream. For example, by using the type of boil-off gas available (e.g., inherent properties corresponding to an amount of energy available from combusting or otherwise converting the particular type of gas, measured properties such as temperature or pressure, or the like), the amount of boil-off gas available (e.g., a mass flow, a volumetric flow, or the like), and the efficiency of the auxiliary power unit, the amount of energy available may be determined. FIG. 2 illustrates a graph 200 depicting an amount of energy available from an auxiliary power unit based on various boil-off gas flow rates in accordance with various embodiments. FIG. 2 includes a first axis 202 corresponding to an electrical output from an auxiliary power unit in kiloWatts (kW), and a second axis 204 corresponding to rate of LNG loss (or boil-off) from an initial volume of LNG. In FIG. 2, an available energy curve 206 is plotted over a range from about a LNG rate loss of about 0.001 (or about 0.1%) to about 0.01 (or about 1%).

A number of values and/or assumptions were used in developing FIG. 2. For example, the embodiments depicted in FIG. 2 correspond to an initial volume of about 11,000 gallons of LNG. The 11,000 gallons may be contained in a single tank. Alternatively, the 11,000 gallons may be contained in a group of tanks operably connected to one or more auxiliary power units. For example, one or more tanks having a storage volume of about 4,000 to 5,000 gallons or less may be used in various embodiments. A group of tanks may share a common boil-off auxiliary power unit in some embodiments, while in other embodiments each tank may be associated with and exclusively use a dedicated boil-off auxiliary power unit.

Further, for FIG. 2, ranges of boil-off rates of about 0.1% to about 1.0% (or about 0.001 to about 0.01) for a 24 hour period are depicted. The boil-off rate is assumed constant over the 24 hour period for the purposes of FIG. 2, so that the boil-off rate sets a boil-off flowrate as well as the total mass of natural gas available as a boil-off gas to an auxiliary power unit for the 24 hour period. Further, the lower heating value (LHV) of the boil-off gas is assumed to be about 19,000 British thermal units per pound mass (BTU/lbm). The fuel energy was then calculated using the above assumptions. The output of the auxiliary power unit was then determined using the calculated fuel energy multiplied by an assumed efficiency of 20%. As shown in FIG. 2, the available energy (or auxiliary power unit output) ranges from about 1.8 kW at about 0.1% boil-off rate to about 1.8 kW at about 1.0% boil-off rate, as indicated by the available energy curve 206. In some embodiments, for example, about 90 kW of auxiliary energy may be desired to operate auxiliary systems (e.g., auxiliary systems of an aircraft). Thus, additional energy may be provided by increasing the boil-off rate (e.g., by heating a source tank containing a cryogenic fluid), the fuel to an auxiliary power unit may be increased via a separate conduit (e.g., a conduit passing LNG from a tank through an evaporator, thereby avoiding heating of the tank), using, additionally or alternatively, an additional auxiliary power unit configured to utilize a different type of fuel, or the like. For example, for a 1.0% boil-off rate producing about 18 kW of energy with about 90 kW desired, an additional auxiliary power unit utilizing jet fuel may be operated to provide about 72 kW for auxiliary systems.

In other embodiments, other flow rates may be employed. For example, lower flow rates may be provided by lower ambient temperatures, higher acceptable tank pressures, improved tank insulation, or the like. Higher flow rates may be provided by, for example, supplementation by heating. Larger (or smaller) amounts of boil-off gas may be provided by larger (or smaller) initial volumes. In various embodiments, other time periods of operation may be employed. Further, other efficiencies may be used in various embodiments based on a particular auxiliary power unit being employed. For example, higher efficiencies may be achieved in some embodiments using a reciprocating engine instead of a turbine.

Figure 3:
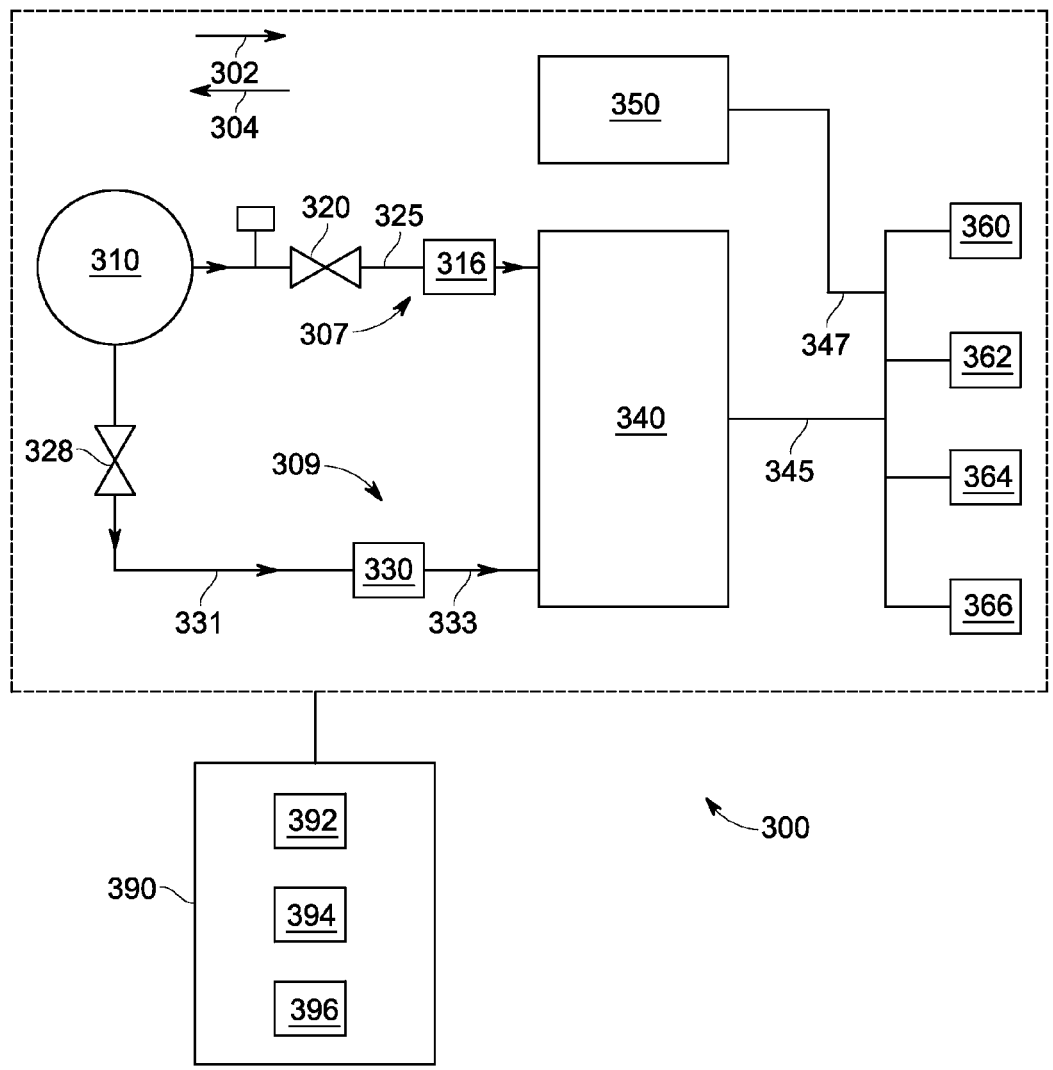
FIG. 3 is a schematic view of a system for utilizing boil-off gas to provide auxiliary power in accordance with various additional embodiments.

FIG. 3 is a schematic view of a system 300 formed in accordance with an embodiment. The system 300 may be similar in respects to the system 100 discussed herein. The system 300 depicted in FIG. 3 includes two auxiliary power modules (one configured to run on boil-off gas from a cryogenic tank, and one configured to run on jet fuel). The system 300 also utilizes a separate conduit from a cryogenic tank to provide supplemental fuel and energy instead of a heater as depicted in FIG. 1. Also, the system 300 in FIG. 3 depicts a plurality of auxiliary functional modules that receive energy from one or more auxiliary power units.

The system 300 (along with other embodiments of systems and methods described herein) is discussed below in connection with the use of LNG as a source of power, for example, for propulsion of an aircraft. In other embodiments, other fuels may be used and/or alternate applications may be powered. The illustrated system 300 includes a cryogenic tank 310, a control valve 320, an evaporator 330, a boil-off auxiliary power unit 340, a second auxiliary power unit 350, auxiliary functional modules 360, 362, 364, 366, and a controller 390.

As seen in FIG. 3, the system 300 defines a downstream direction 302 and an upstream direction 304. The downstream direction 302 may be understood as the direction or path followed by boil-off gas (or products of boil-off gas) as the boil-off gas (or products of boil-off gas) is treated or processed. In the illustrated embodiment, boil-off gas flows from the cryogenic tank 310 via the control valve 320 as a boil-off gas stream 325. The boil-off gas stream 325 flows in the downstream direction 302 to the boil-off auxiliary power unit 340. A first circuit 307 includes the control valve 320 and associated piping, hoses, or the like and defines a path for boil-off gas to travel from the cryogenic tank 310 to the boil-off auxiliary power unit 340. The first circuit 307 may be understood as a boil-off gas circuit.

The system 300 also includes a second circuit 309. The second circuit 309 defines a path for supplemental fuel to travel from the cryogenic tank 310 to the boil-off auxiliary power unit 340. For example, if an amount of energy available from the boil-off gas stream 325 is insufficient to provide a desired amount of energy or otherwise does not satisfy a threshold, an additional amount of fuel may be provided to the boil-off auxiliary power unit to provide supplemental energy (e.g., energy in addition to the energy available from the boil-off stream 325). In the illustrated embodiment, the second circuit 309 (which may be understood as a supplemental circuit) includes the evaporator 330. For example, the boil-off auxiliary power unit 340 may be configured to receive a gaseous fuel intake. In the illustrated embodiment, a liquid stream 331 (e.g., LNG) is directed from the cryogenic tank 310 along the second circuit 309. For example, if, using information from a boil-off detection unit 316 (which may be similar to the boil-off detection unit 116), the controller 390 determines that the available energy from the boil-off stream 325 does not satisfy a threshold, the controller 390 may operate the valve 328 to direct a desired supplemental amount of fuel to the boil-off auxiliary unit 340 along the second circuit 309.

The evaporator 330 is configured to receive the liquid stream 331 and to evaporate at least a portion of the liquid stream 331 to output a gaseous stream 333 (e.g., natural gas in a gaseous phase or state) to the boil-off auxiliary power unit 340. The gaseous stream 333 may supplement the boil-off gas stream 325, or may provide the sole source of fuel if no boil-off gas is available from the cryogenic tank 310.

The cryogenic tank 310 in the illustrated embodiment is used to contain a cryogenic fluid, and may be similar in respects to the cryogenic tank 110 discussed herein. For example, as ambient temperature rises, LNG within the cryogenic tank 310 may evaporate, producing a boil-off gas. As the amount of boil-off gas increases, the pressure within the cryogenic tank 310 will increase. At some point, the pressure may become too large for the cryogenic tank 310, and could result in a potentially catastrophic failure if the cryogenic tank 310 bursts. In the illustrated embodiment, the system 300 includes a tank sensor 312. The tank sensor 312 is configured to sense or detect, directly or indirectly, when the pressure within the cryogenic tank 310 exceeds a desired or acceptable level (e.g., a level selected from a range beneath a maximum pressure for which the cryogenic tank 310 is designed to withstand or for which the cryogenic tank 310 is rated). The control valve 320 is configured to control a flow of boil-off gas out of the cryogenic tank 310 in the downstream direction 302 to the boil-off auxiliary power unit 340. In the illustrated embodiment, the control valve 320 is interposed between the cryogenic tank 310 and the boil-off auxiliary power unit 340, and is disposed downstream of the cryogenic tank 310 and upstream of the boil-off auxiliary power unit 340. In some embodiments, the control valve 320 may be mounted inside, mounted to, or otherwise associated with the cryogenic tank 310. In the illustrated embodiment, when a pressure exceeding a threshold is detected by the tank sensor 312, the control valve 320 opens to allow passage of boil-off gas in the downstream direction 302 as the boil-off gas stream 325, thereby helping reduce the pressure in the cryogenic tank 310.

As the boil-off gas stream 325 passes in the downstream direction, the boil-off gas stream 325 passes through, by, or otherwise proximate to the detection unit 316. The detection unit 316 includes one or more detectors or sensors configured to detect, sense, measure, or determine one or more characteristics of the boil-off gas stream 325. The detection unit 316 may also be configured to provide information to the controller 390 that may be used by the controller 390 to operate one or more aspects of the system 300.

For example, the detection unit 316 may provide flow information describing the flow of the boil-off gas stream 325. Using the flow information, the controller 390 may then determine an available amount of energy that may be provided by the boil-off auxiliary power unit 340 when provided with a flow corresponding to the flow detected or determined for the boil-off gas stream 325. The controller 390 may then operate the system 300 using the determined available energy. For example, if the available energy is less than a threshold (e.g., a level of energy required or desired for operation of one or more auxiliary functional modules), the controller 390 may control one or more settings of the valve 328 to provide supplemental fuel to the boil-off auxiliary power unit 340. In the illustrated embodiment, the tank sensor 312 and the detection module 316 are depicted as separate elements. In various embodiments, all or a portion of the tank sensor and detection module 316 may be integrated or incorporated into a single unit.

In the illustrated embodiment, the boil-off stream 325 is next received by the boil-off auxiliary power unit 340. The boil-off auxiliary power unit 340 may additionally or alternatively receive fuel via the gaseous stream 333. The boil-off auxiliary power unit 340 may be configured to provide power to auxiliary systems (e.g., lighting, air conditioning, or the like) of a vehicle system. In the illustrated embodiment, the boil-off auxiliary power unit 340 is configured as a reciprocating engine that does not require a compressor or other pressurization module to increase the pressure of the boil-off stream 325. In some embodiments, one or more boil-off auxiliary power units may be dedicated to one or more auxiliary components. For example, a boil-off auxiliary power unit may be located proximate to an auxiliary component configured to receive energy from the boil-off auxiliary power unit.

The system also includes a second auxiliary power unit 350. In the illustrated embodiment, the second auxiliary power unit 350 is configured as a gas turbine that utilizes jet fuel (e.g., JP-8) from a tank (not shown in FIG. 3) associated with a propulsion engine (not shown in FIG. 3). Thus, the system 300 includes auxiliary power units that are different types (e.g., one reciprocating engine and one turbine) using different fuels (e.g., one using natural gas and one using jet fuel). The controller 390 may be configured to select between operating either the boil-off auxiliary power unit 340 and the second auxiliary power unit 350. In some embodiments, the controller 390 may be configured to apportion a desired energy level between the boil-off auxiliary power unit 340 and the second auxiliary power unit 350. The selection or apportionment may be based on, for example, available amounts of energy and/or fuels corresponding to the respective power units. In some embodiments, the boil-off auxiliary power unit 340 may be dedicated to one or more particular auxiliary devices or modules while the second auxiliary power unit 350 may be dedicated to one or more other particular auxiliary devices or modules. The selection or apportionment may alternatively or additionally be determined based on a mode of operation.

The auxiliary functional modules 360, 362, 364, 366 receive energy (e.g. electrical energy) along the path 345 and/or the path 347 from the boil-off auxiliary power unit 340 and the second auxiliary power unit 350, respectively. Various auxiliary functional modules may receive energy from a dedicated power unit in some embodiments. In the illustrated embodiment, the controller 390 is configured to apportion the energy from the power units based on available energy from the power units and one or more energy levels desired or required for the auxiliary functional modules. In one example scenario, the functional module 360 may have use for an amount of energy corresponding to the amount of energy available from the boil-off auxiliary power unit 340. Thus, the boil-off auxiliary power unit 340 may be operated to provide energy to the auxiliary functional module 360, and the second auxiliary power module 350 operated to provide energy to the auxiliary functional modules 362, 364, 366.

As also indicated above, the controller 390 may be operably connected to and configured to control operations of the various components of the system 300. The controller 390 may be similar in respects to the controller 190 discussed herein. The controller 390 may acquire information corresponding to the flow of boil-off gas (e.g., one or more of a flow, temperature, or pressure of a boil-off gas stream), determine an available auxiliary energy that may be produced using the boil-off gas, and control the various components of the system 300 accordingly, for example, to produce energy via the boil-off auxiliary power unit 340 and/or the second auxiliary power unit 350 and distribute the energy produced to auxiliary systems or modules. The controller 390 may be configured to selectively operate the boil-off auxiliary power unit 340 and the second auxiliary power unit 350, or to apportion the energy demands of various auxiliary functional modules between the respective power units. The controller 390 may also be configured to supplement the energy otherwise available from the boil-off auxiliary power unit 340 (e.g., by providing additional natural gas or other fuel via a second circuit via which a liquid cryogenic fluid is passed through an evaporator). The controller 390 may be configured as a computer processor or other logic-based device that performs operations based on one or more sets of instructions (e.g., software). The instructions on which the controller 390 operates may be stored on a tangible and non-transitory (e.g., not a transient signal) computer readable storage medium, such as a memory 396. The memory 396 may include one or more computer hard drives, flash drives, RAM, ROM, EEPROM, and the like. Alternatively, one or more of the sets of instructions that direct operations of the controller 390 may be hard-wired into the logic of the controller 190, such as by being hard-wired logic formed in the hardware of the controller 390.

The controller 390 of the illustrated embodiment includes a detection module 392, a control module 394, and a memory module 396 associated therewith. The detection module 392 is configured to receive information from sensors or detectors associated with the system 300 or otherwise accessible to the controller 390. The detection module 392 may also process the received information to determine one or more operating parameters of the system 300. The control module 394 is configured to receive information from the detection module 392 and to control operation of the system 300 responsive to the received information. For example, the control module 394 may be configured to open, close, or adjust one or more valve settings or the like.

It should be noted that the particular arrangement of components (e.g., the number, types, placement, or the like) of the illustrated embodiment may be modified in various alternate embodiments. In various embodiments, different numbers of a given module or unit may be employed, a different type or types of a given module or unit may be employed, a given module or unit may be added, or a given module or unit may be omitted. For example, in various alternate embodiments, the system 300 may include a heater to provide a supplemental amount of boil-off gas, may include one or more treatment modules as discussed herein, may alternatively or additionally include a different type of boil-off auxiliary power unit (e.g., a fuel cell, turbine (with compressor), or the like), or the like.

Figure 4:
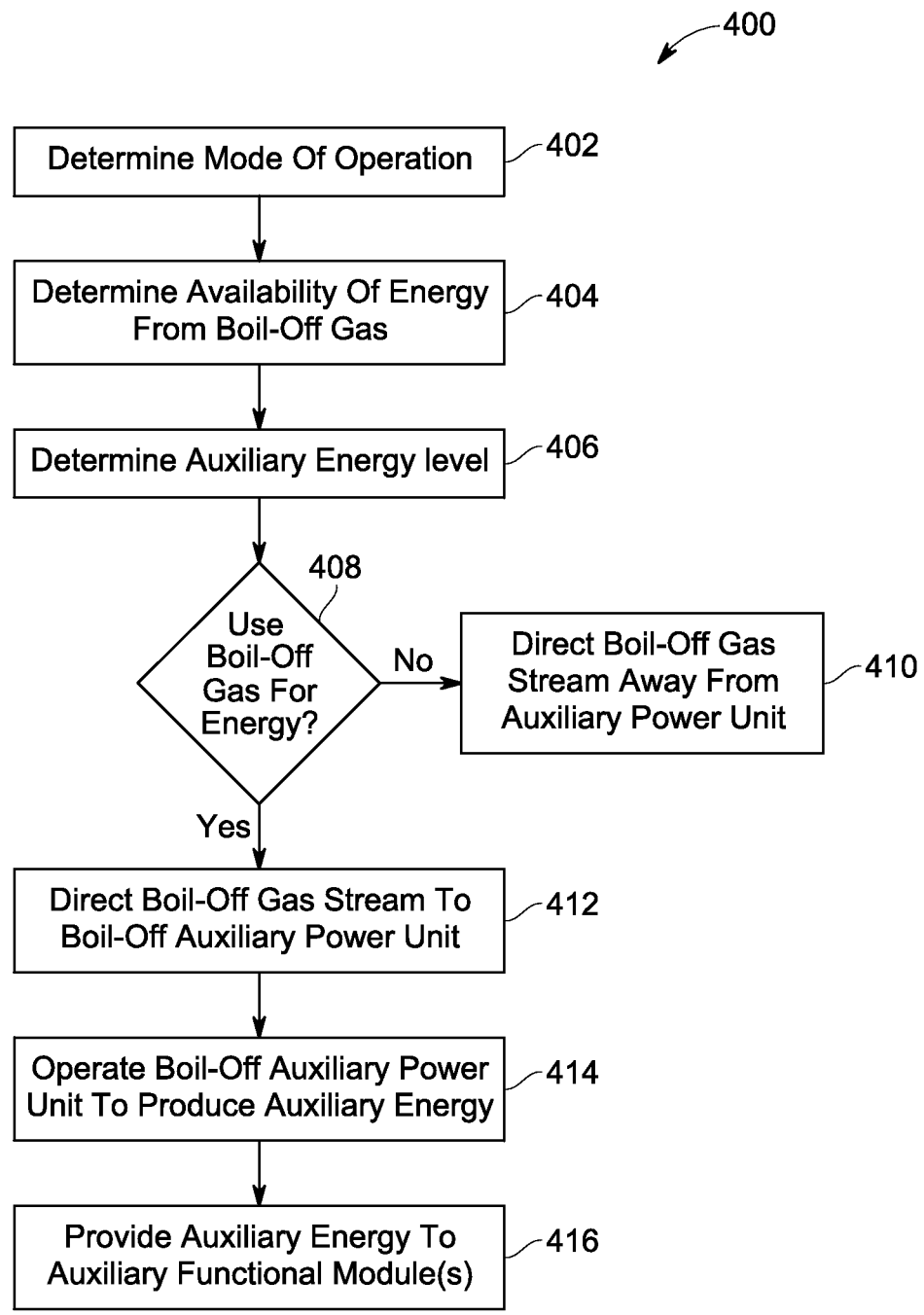
FIG. 4 is a flowchart of a method for utilizing boil-off gas from a cryotank to provide auxiliary power in accordance with various embodiments.

FIG. 4 is a flow chart of a method 400 for providing auxiliary power from a boil-off gas stream in accordance with an embodiment. The method 400, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 402, a mode of operation of a system, such as a vehicle system (e.g., an aircraft) is determined. For an aircraft, the mode of operation, for example, may be a non-flying mode (propulsion engines off, start-up of propulsion engines, idling, taxiing on a runway or other surface, or the like). The mode may be a flying mode such as take-off, cruising, climbing, emergency, or the like. Certain modes where energy from propulsion engines is less desirable or available and/or where energy from boil-off gas is more desirable or available may be preferred for use of boil-off gas to provide energy to auxiliary modes (e.g., start-up, idling, emergency, or the like), whereas other modes may be preferred for not using boil-off gas to provide energy to auxiliary modules (e.g., cruising, or the like). The identification of the mode of operation may be determined or acquired by a controller receiving information from one or more operational systems and/or detectors disposed onboard the aircraft.

At 404, the availability of energy provided from a boil-off gas from a cryogenic tank (e.g, a LNG tank disposed onboard an aircraft) is determined. The boil-off gas stream may be provided from a cryotank experiencing a pressure exceeding at threshold due to the generation of boil-off gas. In some embodiments, the availability of energy may be determined by a controller using detector information from one or more detectors corresponding to one or more characteristics of a boil-off gas stream (e.g., mass or volumetric flow, temperature, pressure, velocity, or the like), boil-off gas information corresponding to properties of the boil-off gas, efficiency information corresponding to the efficiency of one or more auxiliary power units to be provided with the boil-off gas stream, or the like.

At 406, an auxiliary energy level is determined. The auxiliary energy level, for example, may correspond to a minimum energy level at which operation of an auxiliary power unit is practical, feasible, or desirable. The auxiliary energy level may correspond to an amount of energy estimated or otherwise determined to be required or desired by one or more auxiliary functional modules (e.g., an engine starter, a lighting system, a control system or sub-system, a HVAC system, or the like). As another example, the auxiliary energy level may correspond to a proportion or a percentage of an energy level estimated to be required or desired by one or more auxiliary functional modules (e.g., about 10%, about 20%, about 50%, or the like). The auxiliary energy level may correspond to an energy for all auxiliary functions of a system (e.g., an aircraft), or may correspond to a particular auxiliary module or system (or group of such modules or systems) to which a particular auxiliary power unit is dedicated or otherwise associated with.

Based on one or more of the mode of operation, the available energy determined from the boil-off gas stream, or the auxiliary energy level, the boil-off gas stream is next directed along one or more paths. For example, if the mode of operation is a mode for which a boil-off gas auxiliary power unit may be employed to provide power to one or more auxiliary modules or systems, and if the available energy satisfies a threshold auxiliary energy level, the boil-off gas stream (or a portion thereof) may be directed to a boil-off gas auxiliary power unit configured to produce energy (e.g., electrical energy) using the boil-off gas stream. In various embodiments, if the available energy level does not satisfy a threshold, an alternative auxiliary power unit (e.g., an auxiliary power unit that operates on a different fuel) may be selected to provide energy instead of the boil-off auxiliary power unit, supplemental fuel may be provided to the boil-off auxiliary power unit, or the like.

In the embodiment depicted in FIG. 4, at 408, it is determined if an auxiliary power unit is to use a boil-off gas stream to provide energy (e.g., based on the mode of operation, the energy available from the boil-off gas stream, and a threshold auxiliary energy level). If not, at 410, the boil-off gas stream is directed (e.g., by a controller adjusting one or more valve settings) away from the auxiliary power unit. For example, the boil-off gas stream may be directed to one or more treatment modules for re-condensation and return to a cryogenic tank, oxidation or other emission reduction treatment, and/or venting to the atmosphere.

At 412, if it is determined at 408 to use the boil-off gas stream to provide energy, the boil-off gas stream is directed (e.g., by a controller adjusting one or more valve settings) to a boil-off auxiliary power unit or module. At 414, the boil-off auxiliary power unit or module is operated to utilize the boil-off gas stream to produce energy to be provided to one or more auxiliary components (e.g., engine starter, lighting, HVAC, or the like). The boil-off auxiliary power unit, for example, may include a turbine or reciprocating engine configured to produce electrical energy via an associated generator. As another example, the boil-off auxiliary power unit may be configured as a fuel cell.

At 416, energy (e.g., electrical energy) from the boil-off auxiliary power unit is provided to one or more auxiliary functional modules (e.g., auxiliary modules or systems of an aircraft). In some embodiments, electrical energy from a boil-off auxiliary power unit may be provided to one or more functional modules to which the boil-off auxiliary power unit is dedicated. In some embodiments, electrical energy from the boil-off auxiliary power unit may be provided to one or more auxiliary functional modules based on the energy available from the boil-off auxiliary power unit and demand from various auxiliary functional modules. In some embodiments, energy from the boil-off auxiliary power unit may be provided to a power bus configured to provide energy to the auxiliary systems or modules (e.g., of an aircraft). The power bus may also receive energy from additional sources, such as additional auxiliary power units, propulsion engines, or the like.

Figure 5:
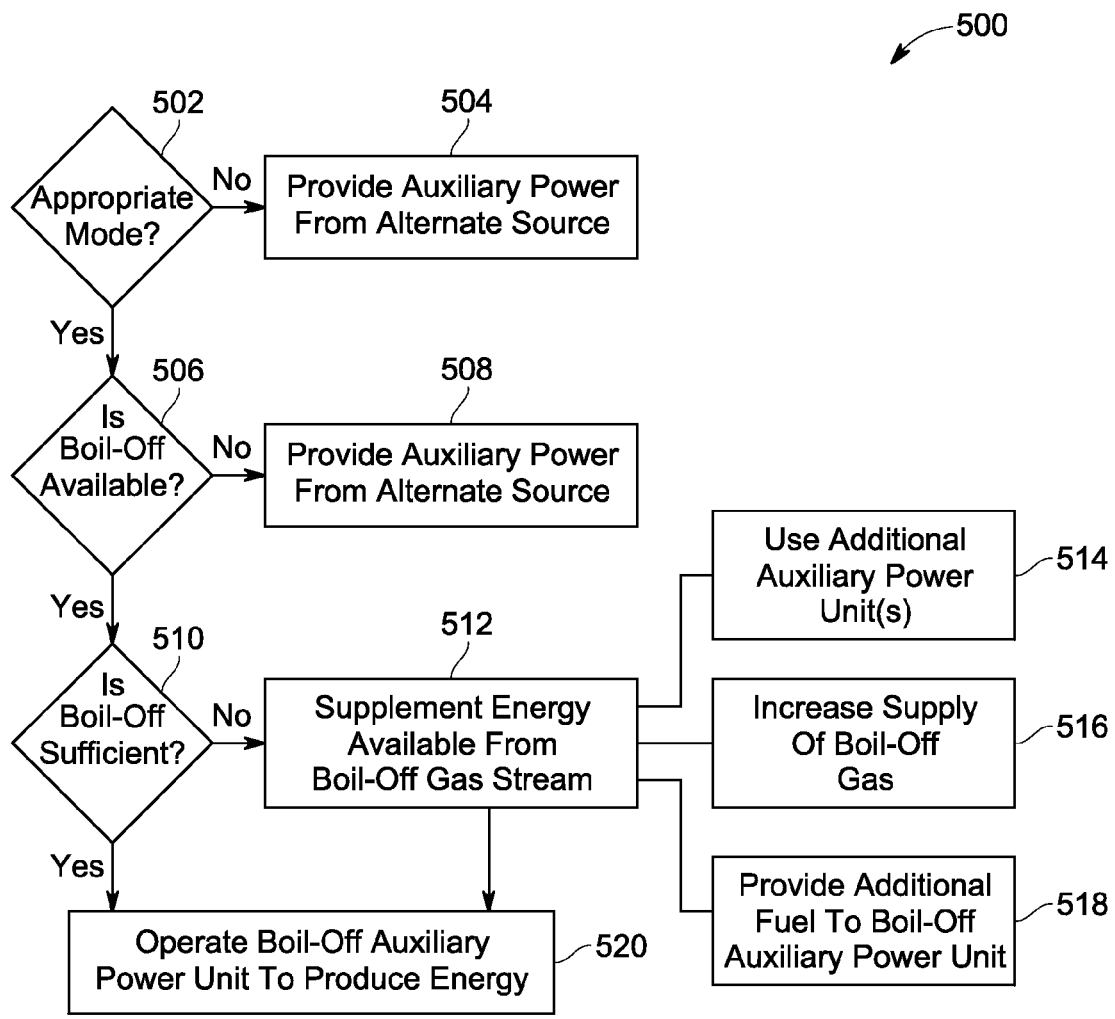
FIG. 5 is a flowchart of a method for utilizing boil-off gas from a cryotank to provide auxiliary power in accordance with various embodiments.

FIG. 5 is a flow chart of a method 500 for providing auxiliary power from a boil-off gas stream in accordance with an embodiment. The method 500, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 502, it is determined if a mode of operation is appropriate for use of a boil-off auxiliary power unit. One or more modes may be identified as modes for which provision of auxiliary energy from boil-off gas is appropriate or desirable, while one or more other modes may be identified as modes for which auxiliary energy is not required or desired to be provided from a boil-off gas stream. For example, when an aircraft is flying, propulsion engines may be operating at a relatively high level at which auxiliary energy is available, and the energy may be produced at a greater efficiency than may be achieved by an auxiliary power unit. Hence, energy from the main propulsion engines may be used in one or more flying modes to power auxiliary modules or systems. However, when an aircraft is not flying, the propulsion engines may be operating at a lower level (or not operating at all) at which provision of power to auxiliary modules from propulsion engines may not be practical, feasible, or otherwise desirable. Further, production of boil-off gas may be increased when an aircraft is not flying (e.g., due to higher ambient temperatures, larger amounts of cryogenic fluid in a tank before consumption as part of a trip or mission, or the like), so that use of boil-off gas to provide energy may be particularly advantageous in one or more non-flying modes. It should be noted, however, in some embodiments, boil-off gas may be used in one or more flying modes (e.g., an emergency mode where energy from the propulsion engines may not be desirably used for purposes other than propulsion), and that energy from a propulsion engine may be used for auxiliary power in non-flying modes. Further still, a mode of operation may include a low fuel mode (e.g., auxiliary power from boil-off gas may be preferred when a fuel (e.g., JP-8 or other jet fuel) for a propulsion engine is below a threshold level in one or more storage tanks).

At 504, if the mode of operation is determined inappropriate for the provision of power from a boil-off auxiliary power unit, auxiliary power is provided from an alternate source. For example, the alternate source of energy may be one or more propulsion engines (e.g., during cruising or normal in-flight operation).

At 506, if the mode of operation has been determined to be appropriate, it is determined if boil-off gas is available. For example, if there is a relatively low amount of fluid in a cryogenic tank, boil-off gas may not be produced, or may not be produced in sufficient quantity to provide to a boil-off auxiliary power unit.

If boil-off gas is not available, auxiliary power from another source is provided at 508. For example, the alternate source may be a separate auxiliary power unit operating on a different fuel (e.g., jet fuel) that is selected to provide energy instead of the boil-off auxiliary power unit. As another example, the alternate source of energy may be one or more propulsion engines (e.g., during cruising or normal in-flight operation). As yet another example, the alternate source may be a different type of fuel provided to the boil-off auxiliary power unit. In some embodiments, the boil-off auxiliary power unit may be a dual fuel power unit configured to use a boil-off gas (e.g., natural gas evaporated from a LNG tank) or a different fuel (e.g., jet fuel). When boil-off gas is not available (or not available in a sufficient quantity), the dual fuel boil-off gas auxiliary power unit may be provided with, for example, jet fuel, instead of boil-off gas.

At 510, if boil-off gas is available, it is determined if the boil-off gas available is sufficient to satisfy a threshold (e.g., a threshold level of energy that may be produced using the boil-off gas). For example, in some embodiments, an available energy is determined corresponding to the energy that may be produced by a given auxiliary power unit (e.g., a power unit having a particular efficiency rating) using the boil-off gas stream. The determined available energy may then be compared to a threshold corresponding to all or a portion of an auxiliary energy level corresponding to an amount of energy desired or required to power one or more auxiliary functional modules. If the available energy from the boil-off gas stream is sufficient, the method 500 may proceed to 520.

If the energy available from the boil-off gas stream is not sufficient to satisfy a threshold, the energy that may be provided by the boil-off auxiliary power unit using the available boil-off gas stream may be supplemented at 512. Various modes or techniques of energy supplementation may be used alternatively or additionally to each other in various embodiments. In alternate embodiments, if the energy from the boil-off gas stream is not sufficient, the boil-off auxiliary power unit may not be utilized, and a controller may selectively utilize an auxiliary power unit that uses a different fuel instead.

At 514, the energy that may be provided by the boil-off auxiliary power unit using the available boil-off gas stream may be supplemented by using one or more additional auxiliary power units. An additional power unit may be configured to run on a different type of fuel, such as jet fuel (e.g., jet fuel available from one or more fuel tanks associated with one or more propulsion engines). The energy demand from various auxiliary functional units may be apportioned between a boil-off gas auxiliary power unit and an additional auxiliary power unit. In one example scenario, each power unit provides power to a power bus accessible by the various auxiliary functional modules, with the boil-off gas auxiliary power unit operated to produce as much energy as possible (e.g., to have all boil-off gas directed to the boil-off auxiliary power unit). In another example scenario, an auxiliary power unit may be dedicated to provide energy to a particular auxiliary module or group of auxiliary modules.

As another example, at 516 the energy that may be provided by the boil-off auxiliary power unit using the available boil-off gas stream may be supplemented by increasing the supply of boil-off gas to the boil-off auxiliary power unit. For example, a controller may act to operate a heater to provide heat to a cryogenic tank from which the boil-off gas stream is directed. The heater is configured to provide heat to increase the amount of fluid boiling or evaporating in the cryogenic tank to increase the amount of boil-off gas in a boil-off gas stream. With an increased or supplemented supply of boil-off gas, the boil-off gas auxiliary power unit may produce more energy. Alternatively or additionally, the supply of boil-off gas may be increased by lowering a threshold tank pressure at which boil-off gas is provided from a tank.

As still another example, at 518 the energy that may be provided by the boil-off auxiliary power unit using the available boil-off gas stream may be supplemented by providing an additional or supplemental separate supply of evaporated LNG to the boil-off auxiliary power unit. For example, boil-off gas may be provided along a first circuit. A second circuit may receive LNG (or other liquid fuel) from the tank from which the boil-off gas was produced, pass the received liquid through an evaporator or other device configured to change the state of the liquid (e.g., LNG) to a gaseous phase, and deliver the gaseous fuel to the boil-off auxiliary power unit.

At 520, the boil-off auxiliary power unit is operated to produce energy. For example the auxiliary power unit may be a turbine, reciprocating engine, or the like, that is configured to combust the boil-off gas and produce a mechanical energy output (e.g., rotation of a shaft) used to generate electric energy via a generator. As another example, the auxiliary power unit may be a fuel cell that generates electric power. The generated electrical energy may then be distributed to one or more auxiliary functional modules.

Figure 6:
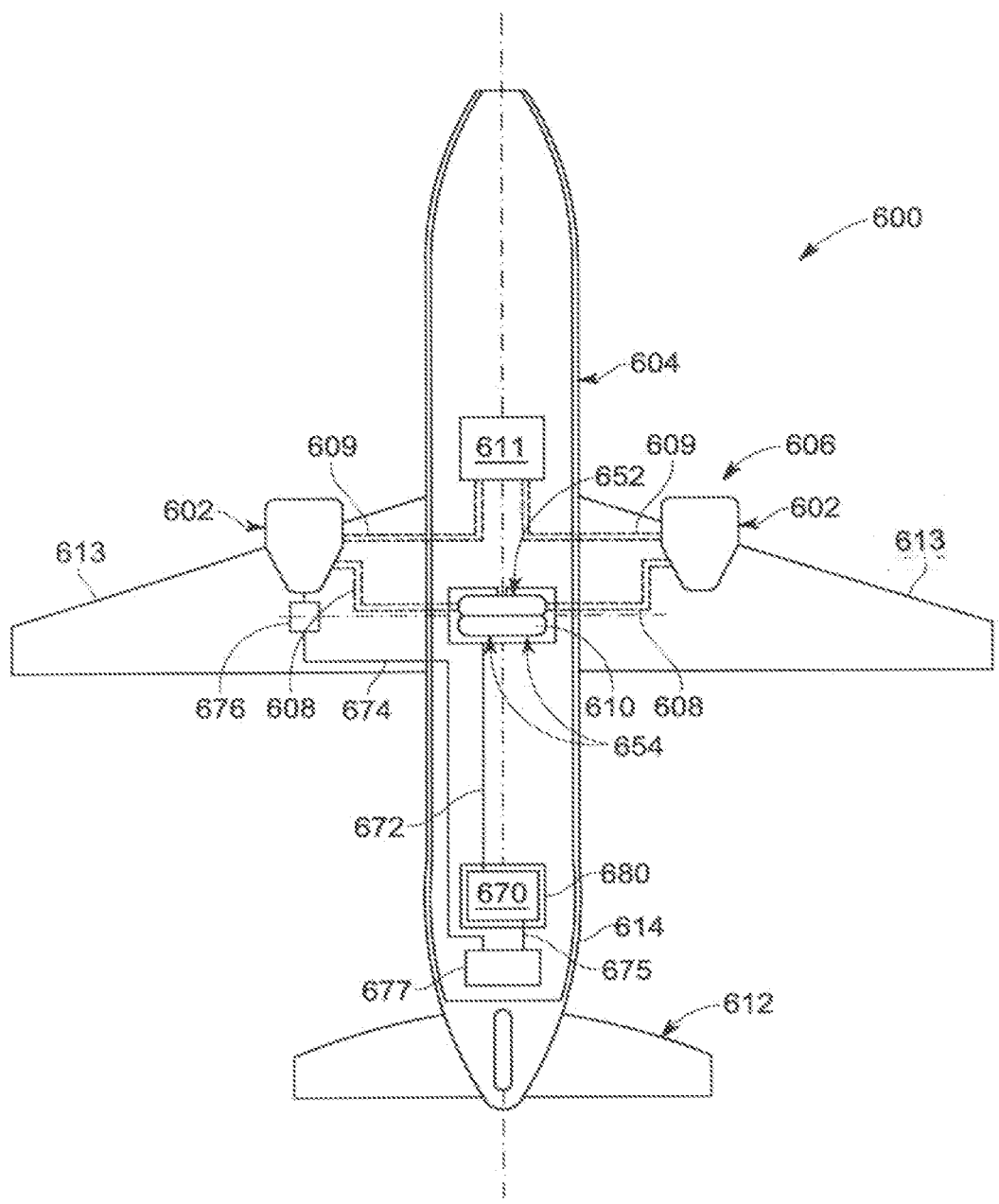
FIG. 6 is a schematic illustration of an embodiment of a system for providing auxiliary power disposed within an aircraft in accordance with various embodiments.

As indicated above, a cryogenic tank may be located on-board an aircraft for containing fuel for an engine of the aircraft. For example, FIG. 6 is a schematic illustration of an exemplary embodiment of an aircraft 600 that includes one or more engines 602 that use a cryogenic fluid as fuel. In the exemplary embodiment of the aircraft 600, the cryogenic fluid used as fuel for the engine 602 and contained by the cryogenic tank 610 on-board the aircraft 600 is LNG. In various embodiments, the cryogenic fluid contained by the cryogenic tank 610 for use as fuel for the aircraft engine 602 may be any type of cryogenic fluid (which may be contained within the cryogenic tank 610 in liquid and/or gaseous form) that is suitable for use as fuel for the aircraft engine 602. The depicted aircraft 600 is configured as a dual fuel aircraft, and is configured so that the engine 602 may use LNG from the cryogenic tank 610 or jet fuel (e.g., JP-8) stored in a jet fuel tank 611. In various embodiments, for example, other cryogenic fuels such as hydrogen ($H_2$) may be utilized. Various fuels may provide different advantages and/or drawbacks. For example, as of the time of submission of this disclosure, JP-8 may provide more available power to the engine 602, while LNG may be more affordable. Thus, JP-8 may be consumed by the engine 602 during events that require more power (e.g., take-off, emergencies, or the like) while LNG may be used during events that require less power (e.g., cruising or the like). In the exemplary embodiment of the aircraft 600, the aircraft 600 is a fixed wing airplane.

The aircraft 600 includes an airframe 604 and an engine system 606, which includes the engine 602 and the cryogenic tank 610. The engine system 606, including the cryogenic tank 610 and the jet fuel tank 611, is located on-board the airframe 604. Specifically, the engine 602, the cryogenic tank 610, the jet fuel tank 611, and various other components of the engine system 606 are positioned at various locations on and/or within the airframe 604 such that the engine 602, the cryogenic tank 610, the jet fuel tank 611, and the various other components of the engine system 606 are carried by the airframe 604 during flight of the aircraft 600. It may be noted that the various components of the engine system (e.g., the engine 602 and the cryogenic tank 610) need not necessarily be mounted together. Indeed some components of the engine system 606, such as the cryogenic tank 610, may be configured for removal and replacement from the aircraft 600.

The engines 602 of the illustrated embodiment are operatively connected in fluid communication to receive cryogenic fluid from the cryogenic tank 610, for example through fuel conduits 608. The engines 602 use the cryogenic fluid as fuel to generate thrust for generating and controlling flight of the aircraft 600. The cryogenic fluid may be stored as a liquid in the cryogenic tank 610, but may be provided to the engines 602 in a gaseous state. The engine system 606 may include one or more fuel pumps (not shown). Each fuel pump is operatively connected in fluid communication with the cryogenic tank 610 and with one or more corresponding engines 602 for pumping cryogenic fluid from the cryogenic tank 610 to the engine(s) 602. Fuel pumps may be disposed in various locations along the airframe 604, such as, but not limited to, within an internal volume of the cryogenic tank 610, mounted to a corresponding engine 602, located proximate a corresponding engine 602, or the like. Similarly, the engines 602 are operatively connected in fluid communication to receive jet fuel (e.g., JP-8) from the jet fuel tank 611, for example, through fuel conduits 609. The engine system 606 may also include one or more fuel pumps (not shown) associated with the jet fuel tank 611.

In the exemplary embodiment of the aircraft 600 depicted in FIG. 6, the engines 602 are configured to use two different fuels, including at least natural gas as fuel. In some other embodiments, the engines 602 are configured to use at least another cryogenic fluid as fuel. In various embodiments, the cryogenic fluid pumped from the cryogenic tank 610 to the engines 602 may be supplied to the engines 602 in a gaseous form and/or as a liquid, no matter in which state(s) the cryogenic fluid is contained in the cryogenic tank 610. For example, in the exemplary embodiment of the aircraft 600, the engines 602 use the natural gas as fuel in the gaseous state. The engine system 606 may include one or more heating systems that heat LNG stored by the cryogenic tank 610 to change the LNG stored by the cryogenic tank 610 to the gaseous state for supply to the engines 602 as fuel. In the illustrated embodiment, the engine system 606 may also include one or more evaporators (not shown) disposed along a fuel conduit 608 and interposed between the cryogenic tank 610 and an engine 602, with the evaporators configured to change LNG provided by the cryogenic tank 610 to natural gas in a gaseous state or phase to be supplied to the engines 602.

Each engine 602 may be any type of engine, such as, but not limited to, a turbine engine, an engine that drives a propeller or other rotor, a radial engine, a piston engine, a turboprop engine, a turbofan engine, and/or the like. Although two engines are shown in the illustrated embodiments, the aircraft 600 may include any number of engines 602. Although shown located on wings 613 of the airframe 604 in FIG. 6, in various embodiments different mounting locations for each engine 602 along the airframe 604 may be employed. For example, the aircraft 600 may include an engine located at a tail 612 and/or another location along a fuselage 614 of the airframe 604.

The cryogenic tank 610 is supported on one or more support surfaces 652 of the aircraft 600. In the exemplary embodiment of the aircraft 600, the cryogenic tank 610 is supported on two pallets 654 that are loaded on-board the aircraft 600 and include the support surface 652. In other embodiments, the cryogenic tank 610 may be supported on a single pallet. The cryogenic tank 610 may be secured to the pallets 654 using any suitable attachment member, such as, but not limited to, straps, cables, chains, clamps, threaded fasteners, and/or the like. In some embodiments, the attachment member(s) used to secure the cryogenic tank 610 to the pallets 654 is selected such that the cryogenic tank 610 is configured to withstand up to or greater than an acceleration of approximately nine times gravitational acceleration without dislodging from the pallets 654. In some embodiments, the cryogenic tank 610 is connected directly to the fuselage 614 via support feet or the like. In various embodiments, the cryogenic tank 610 may be configured as an integral or otherwise fixed part of an aircraft, and may be disposed in any appropriate portion of the aircraft where the fuel tank may be stored.

A boil-off auxiliary power system 670 is also mounted to the aircraft 600 and operatively connected to the cryogenic tank 610. The boil-off auxiliary power system 670 may be configured similarly in respects to embodiments discussed herein, such as the system 100 or the system 300. In the illustrated embodiment, the boil-off auxiliary power system 670 may be connected to the cryogenic tank 610 via a boil-off gas conduit 672. The boil-off gas conduit 672, for example, may include a length of piping and/or hose along with appropriate connection members. A control valve for controlling the flow of boil-off gas from the cryogenic tank 610 to the boil-off auxiliary power system 670 may be positioned along the boil-off gas conduit 672 or otherwise associated therewith. The boil-off gas auxiliary power system 670 may include one or more valves, pressurization modules, detectors, auxiliary power units, control units, boil-off treatment modules, or the like as discussed herein in connection with, for example, the embodiments depicted in FIGS. 1 and 3.

In the illustrated embodiment, the boil-off gas auxiliary power system 670 is mounted on a pallet 680 that is removably mounted to the aircraft 600. Thus, the boil-off gas auxiliary power system 670 may be readily loaded on or unloaded off of the aircraft 600. The pallet 680 may be configured and mounted in a generally similar fashion as discussed above in connection with the pallets 654. In various embodiments, the boil-off gas auxiliary power system 670 may be mounted on the same pallet or pallets as the cryogenic tank 610 and configured to be loaded or un-loaded therewith as a single effective unit. In some embodiments, the boil-off gas auxiliary power system 670 may be a separately loadable unit mounted on one or more dedicated pallets (e.g., pallet 680) and operatively connected to the cryogenic tank 610 after loading. In some embodiments, the boil-off gas auxiliary power system 670 may include a dedicated controller, while in other embodiments, a control module associated with additional operations of the aircraft 600 may be employed to control the operation of the boil-off gas auxiliary power system 670.

In the illustrated embodiment, the boil-off gas auxiliary power system 670 is configured to receive boil-off gas from the cryogenic tank 610 via the boil-off gas conduit 672, produce energy using the received boil-off gas, and provide electrical energy along power conduit 674, 675 to one or more auxiliary functional modules 676, 677, respectively. The power conduits 674, 675 may include one or more wires or cables. In the illustrated embodiment, the auxiliary functional module 676 is depicted schematically as an engine starter module positioned proximate to an engine 602. In some embodiments, the boil-off gas auxiliary power system 670 (or aspects thereof) may be dedicated to a particular auxiliary functional module and/or positioned proximate to the particular auxiliary functional module, such as an engine starter module. For example, the boil-off gas auxiliary power system may include a dedicated auxiliary power unit sized and/or positioned for a specific use (e.g., providing energy for one or more engine starters, providing energy for lighting, such as lighting a particular portion of the aircraft 600, or the like). In the illustrated embodiment, the boil-off gas auxiliary power system 670 is disposed proximate the tail 612 of the aircraft 600, and is shared by auxiliary functional modules. The auxiliary functional module 677 in the illustrated system is configured as a heating, ventilation, and air conditioning (HVAC) system that receives electrical energy via the power conduit 675 from the boil-off gas auxiliary power system 670. Additional power conduits (not shown) to the auxiliary functional modules 676, 677 may be provided from one or more engines 602 and/or one or more additional auxiliary power systems.

As just one example scenario, electrical energy may be provided to one or more functional systems from the boil-off gas auxiliary power system 670 when the aircraft 600 is in a first mode of operation (e.g., idling, emergency, or the like) and an available energy from the boil-off gas auxiliary power system 670 satisfies a threshold (e.g., an energy level desired or required to power one or more auxiliary functional systems); electrical energy may be provided to one or more functional systems from a different auxiliary power system when the aircraft 600 is in the first mode (e.g., idling, emergency, or the like) and an available energy from the boil-off gas auxiliary power system 670 does not satisfy a threshold (e.g., an energy level desired or required to power one or more auxiliary functional systems); and electrical energy may be provided to one or more functional systems from one or more of the engines 602 when the aircraft 600 is in a second mode of operation (e.g., cruising, or the like). In alternate embodiments, various different types of auxiliary functional modules or systems may alternatively or additionally receive electrical energy from the boil-off gas auxiliary power system 670. Further still, energy may be distributed among the auxiliary functional modules 676, 677 depending on the mode of operation. For example, energy may be directed to an engine starter module only during modes for which a corresponding engine is off or being started.

The cryogenic tank 610 and/or the boil-off gas auxiliary power system 670 may be located at any suitable location on and/or within the airframe 604. In the exemplary embodiment of the aircraft 600, the pallets 654 and the cryogenic tank 610 supported thereon as well as the pallet 680 and the boil-off gas auxiliary power system 670 supported thereon are located within a cargo hold of the fuselage 614 of the airframe 604. In the illustrated embodiment, the cryogenic tank 610 and the boil-off gas auxiliary power system 670 are not integral to the airframe 604 of the aircraft 600. Instead, the cryogenic tank 610 and the boil-off gas auxiliary power system 670 are supported on the pallets configured to be loaded on-board the airframe 604, rather than being integral to the airframe 604. In alternate embodiments, the cryogenic tank 610 and/or one or more aspects of the boil-off gas auxiliary power system 670 may be permanently mounted or integral to the airframe 604.

Thus, various embodiments provide for reduced emission of combustible gases and/or otherwise potentially harmful emissions, while providing for relatively compact, lightweight cryogenic tanks and auxiliary power systems that are configured to utilize boil-off gas to provide auxiliary power. Various embodiments may also provide improved conservation of a fuel (e.g., LNG, jet fuel, or the like).

Various embodiments of systems and methods are described and illustrated herein with respect to being used in conjunction with a fuel tank on-board an aircraft for containing LNG that is used as fuel for an engine of the aircraft. However, certain embodiments are not limited to being used with aircraft, and are not limited to containing LNG. For example, various embodiments of may be located on any other stationary and/or mobile platform, such as, but not limited to, trains, automobiles, watercraft (e.g., a ship, a boat, a maritime vessel, and/or the like), or the like.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer", "controller", and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A vehicle system, comprising:
   a detector to detect a characteristic of a boil-off gas stream from a cryotank configured to hold a cryogenic fluid;
   a boil-off auxiliary power unit configured to receive the boil-off gas stream and use the boil-off as stream to provide auxiliary power to a vehicle system; and
   a controller configured to:
      acquire information from the detector corresponding to the characteristic,
      determine, using the information acquired from the detector, an available boil-off auxiliary energy that is available from the boil-off auxiliary power unit,
      determine a mode of operation of the vehicle system,
      determine an auxiliary energy level for the vehicle system, and
      operate the boil-off auxiliary power unit based on the available boil-off auxiliary energy, the mode of operation, and the auxiliary energy level, wherein the vehicle system comprises an aircraft, the boil-off auxiliary power unit is operated by the controller to provide energy using the boil-off gas stream if the aircraft is in a first, non-flying mode, and wherein the boil-off auxiliary power unit is not operated to provide energy when the aircraft is in a second, flying mode.

2. The vehicle system of claim 1, wherein the controller is configured to direct the system to provide supplemental energy if the available boil-off auxiliary energy is below a threshold.

3. The vehicle system of claim 2, wherein a heater is operably connected to the cryotank, and wherein the controller is configured to operate the heater to increase an amount of boil-off gas produced by the cryogenic fluid in the cryotank to provide the supplemental energy.

4. The vehicle system of claim 1, wherein the controller is configured to select between operation of the boil-off auxiliary power unit and a second auxiliary power unit based on the available boil-off auxiliary energy and the auxiliary energy level, wherein the second auxiliary power unit is configured to use a second fuel that is different from the cryogenic fluid.

5. The vehicle system of claim 1, wherein the controller is configured to apportion the auxiliary energy level between the boil-off auxiliary power unit and a second auxiliary power unit, wherein the second auxiliary power unit is configured to use a second fuel that is different from the cryogenic fluid.

6. The vehicle system of claim 1, wherein the boil-off auxiliary power unit is dedicated for use with a functional module of an aircraft and disposed proximate to the functional module of the aircraft.

7. The vehicle system of claim 6, wherein the boil-off auxiliary power unit is configured to provide energy to an engine starting module.

8. The vehicle system of claim 1, wherein the system further includes a boil-off gas treatment module, the boil-off gas treatment module including one or more of an emergency vent, a re-condensing system, or an oxidation system, and wherein the controller is configured to direct at least a portion of the boil-off gas stream to the boil-off gas treatment module if the at least a portion of the boil-off gas stream is not being utilized by the boil-off auxiliary power unit.

9. The vehicle system of claim 1, wherein the boil-off auxiliary power unit is a dual-fuel auxiliary power unit configured to operate on at least two different types of fuels, and wherein the controller is further configured to select a fuel provided to the boil-off auxiliary power unit based on the available boil-off auxiliary energy and the auxiliary energy level.

10. The vehicle system of claim 1, wherein the characteristic is at least one of mass, volumetric flow, pressure, or temperature.

11. The vehicle system of claim 1, wherein the boil-off power auxiliary unit comprises a fuel cell.

* * * * *